June 17, 1958 — I. SHUR — 2,838,821
SNAP FASTENERS
Filed Sept. 23, 1953 — 2 Sheets-Sheet 1

INVENTOR
IRA SHUR
BY
ATTORNEY

June 17, 1958     I. SHUR     2,838,821
SNAP FASTENERS

Filed Sept. 23, 1953     2 Sheets-Sheet 2

INVENTOR
IRA SHUR,
BY
ATTORNEY

United States Patent Office 2,838,821
Patented June 17, 1958

2,838,821

SNAP FASTENERS

Ira Shur, Bayside, N. Y., assignor to Waldes Kohinoor, Inc., Long Island City, N. Y., a corporation of New York Application September 23, 1953, Serial No. 381,769

3 Claims. (Cl. 24—217)

This invention relates to improvements in snap fasteners, snap fastener tape closures and the method of manufacturing the latter, and more particularly to improved snap fasteners of the rigid stud and resilient socket type in which both the stud and socket members are made wholly of plastic material, to improved snap fastener tape closures incorporating such plastic stud and socket members as the fastener elements thereof, and to an improved method of producing the tapes for such a closure.

The numerous advantages of snap fasteners made of plastic material as compared to metal snap fasteners in respect to economy and ease of manufacture, pleasing appearance, and ability to be colored as desired for a particular application, have long been known, but such have not heretofore been fully realized in commercially acceptable form. Broadly stated, the present invention contemplates and aims to provide a plastic snap fastener possessing the aforesaid advantages while at the same time meeting the commercial requirements of a good snap fastener as to adequate holding power, flat construction, and ease of production in a simple mold.

Another general object of the invention is the provision of a plastic snap fastener of the rigid stud and resilient socket type wherein the stud and socket members may be readily engaged and disengaged but whose construction and design are such that when said members are engaged the stud member is held to the socket member in thoroughly dependable manner, and also such that a substantial separating force must be exerted to effect their disengagement, thereby avoiding the danger of accidental disengagement of said members.

A more particular object of the invention is the provision of a plastic snap fastener employing a resilient socket member, whose construction and design are such that the capacity of the socket member to spread under a given force imparted thereto by the stud member may be readily and simply controlled in the manufacture thereof.

Yet another object of the invention is the provision of a novel construction of plastic snap fastener socket enabling the socket member to deform circularly when spread by the stud member upon insertion thereof and thereupon to return to an unstressed state in which it effectively locks the stud member thereto.

A further object of the invention is the provision of improved snap fastener tapes employing plastic stud and socket members characterized as in the foregoing as their fastener elements.

A still further object of the invention is the provision of a method of producing snap fastener tapes employing plastic stud and socket members characterized as in the foregoing as their fastener elements.

Yet another object of the invention is the provision of a method of attaching plastic stud and socket members to the tapes of a snap fastener closure in the operation of molding said members.

Other objects and advantages of a plastic snap fastener according to the invention will be apparent from the following detailed description thereof, taken with the accompanying drawing illustrating the preferred form and construction of both the stud and socket members, wherein Fig. 1 is a side elevation of a plastic snap fastener according to the invention, with the component fastener members being shown in their engaged or mated relation;

Figure 5:
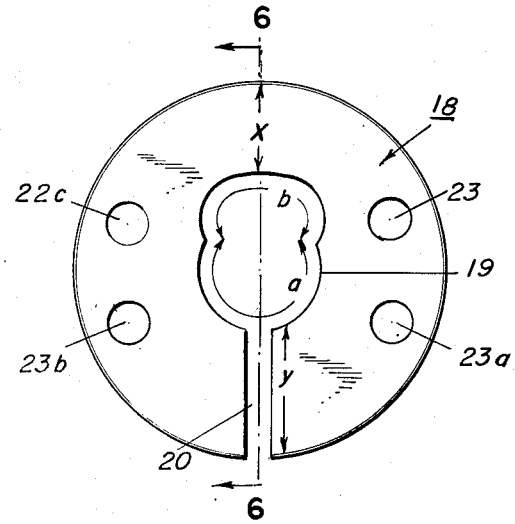
Fig. 5 is a plan view of the improved socket member of the fastener shown in Fig. 1.
Figure 6:
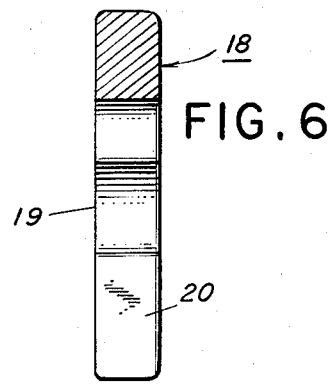
Fig. 6 is a section taken along line 6—6 of Fig. 5.
Figure 7:
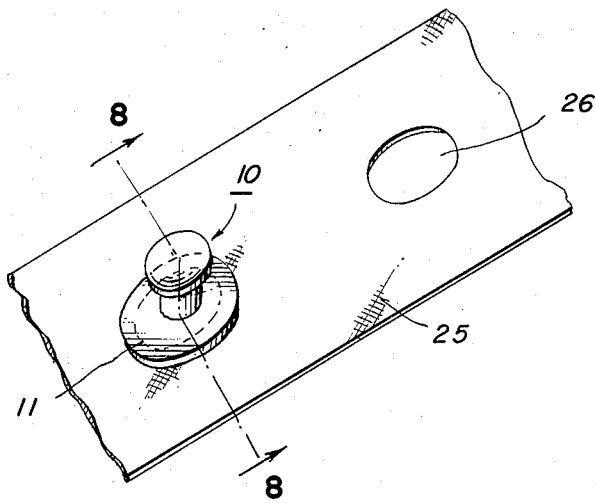
Fig. 7 is a fragmentary perspective view illustrating a portion of an improved stud-carrying tape wherein the stud members of the type illustrated in Figs. 3 and 4 are attached to the tape in the molding of said members, according to the invention.
Figure 9:
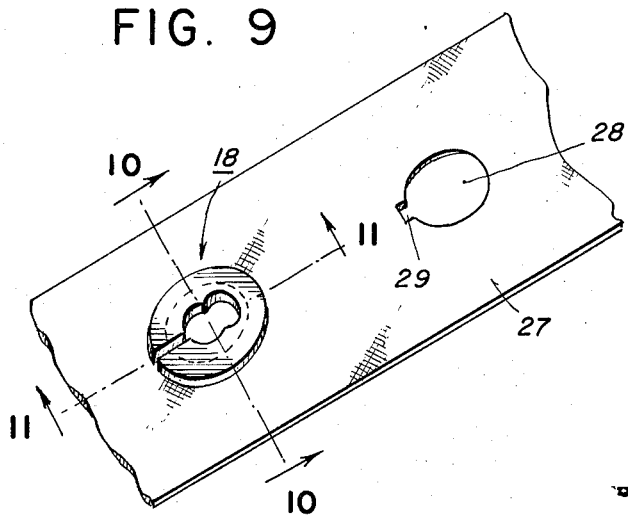
Figure 10:
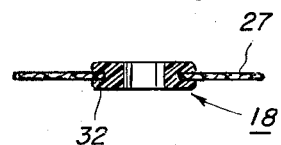
Figure 11:
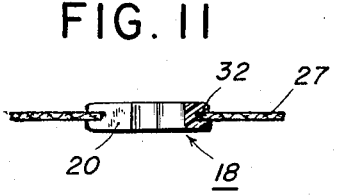

Fig. 9 is a fragmentary perspective view generally similar to Fig. 7 but illustrating a socket-carrying tape with socket member characterized as in Figs. 5 and 6 attached thereto in the molding of said members; and Figs. 10 and 11 are sections taken, respectively, on lines 10—10 and 11—11 of Fig. 9.

Figure 1:
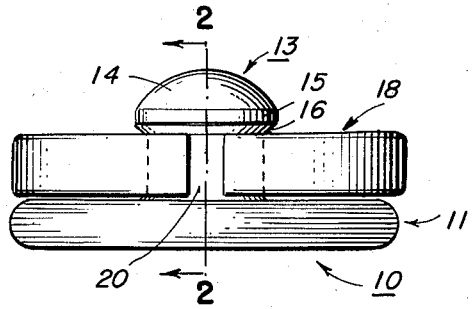
Figure 2:
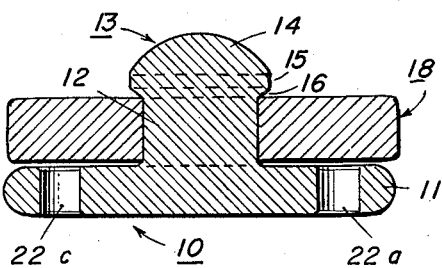
Fig. 2 is a section taken along line 2—2 of Fig. 1.
Figure 3:
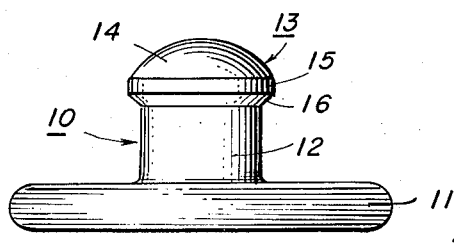
Figs. 3 and 4 are side elevation and plan views, respectively, of the stud member of the fastener illustrated in Fig. 1.

The improved plastic snap fastener according to this invention consists of two component fastener members, each made wholly of plastic material and preferably of a thermoplastic material such as nylon. Such a fastener is of the rigid stud and resilient socket type, of which the stud member generally designated 10 comprises a base portion 11 illustratively having circular contour, a cylindrical neck portion 12 extending axially from the base, and a head portion generally designated 13. As best seen in Fig. 3, the head portion comprises a part-spherical end surface 14 on a cylindrical body 15, and it is connected to the neck portion by a chamfered shoulder 16. As the inclination of the chamfered shoulder 16 determines the pull (separating force) which must be exerted to disengage the stud member 11 from the socket member to be described, such pull or separating force may be controlled by a proper choice of the angle of inclination of said chamfered shoulder. It will also be noted that by giving greater inclination to the chamfered shoulder 16 than to the part-spherical head surface 14, the force required to pull the stud member from the socket member may be made greater than that required to insert the stud member into the socket member.

Referring to Figs. 5 and 6, the socket member consists of a simple disc 18 of thickness closely corresponding to that of the axial length of the neck portion 12 of the stud member, and which is further such as to render the disc substantially rigid in axial direction. As best seen in Fig. 5, the socket member is provided with a generally central neck-receiving opening 19 and with a radial slit 20 extending between said opening and its outer periphery. The diameter of at least the major arc of the central opening 19 is substantially equal to the diameter of the neck portion 12 of the stud member 10, which latter is of course smaller than the cylindrical body 15 of the stud head portion 13. However, due to the provision of the radial slit 20, which imparts a degree of resilience to the disc in its own plane, the socket member may be spread the limited amount necessary to permit the head portion 13 of the stud member to pass through its central opening 19, whereupon the socket member contracts to its unstressed diameter, thus firmly locking itself between the socket member head and base portions.

Figure 4:
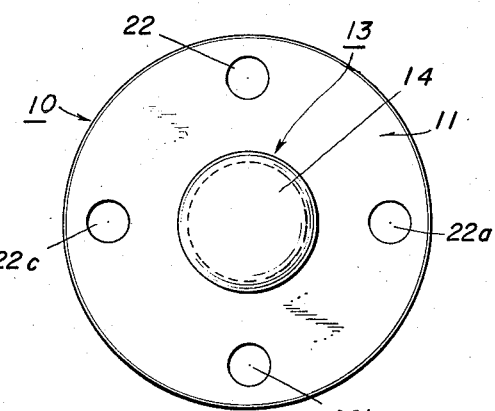

As seen in Figs. 4 and 5, conventionally the base portion 11 of the stud member and the circular disc forming the socket member 18 may be each provided with a plurality of sewing holes of which the stud member sewing holes are designated 22—22c, and the socket member sewing holes are designated 23—23c. Such sewing holes enable the stud and socket members of the fastener to be secured by sewing to an article of clothing, handbag, purse and the like, when said members are formed apart from their tapes.

While a plastic snap fastener employing a disc-like socket member provided with a neck-receiving opening 19 of circular form, and which is concentric with the periphery of the disc, may function satisfactorily for some uses, such does not give the optimum of advantages desired, since such a socket member deforms ovally when spread by the insertion of the larger diameter head portion 13 of the stud member, in much the same manner that a retaining ring of uniform section height (radial width) deforms ovally when spread over a shaft, pin or the like on which it provides an artificial shoulder. This oval deformation may result in the socket member being unduly stressed along certain diameters by passage of the stud head through the opening and/or in taking on a permanent set, in turn resulting in the socket member having three-point contact only with the cylindrical surface of the neck portion 12 of the stud member, as distinguished from tight fit throughout its full arcuate length against said neck portion, as is desirable for high holding power.

To overcome the undesirable oval deformation of the socket member and thereby to achieve the maximum holding power capable of being exerted by the socket member, and also to increase its capacity to spread without taking on a permanent set, it is a feature of the invention that the opening 19 for the insertion of the stud head 13, rather than being formed concentric throughout with the outer periphery of the disc-like socket member 18, is formed effectively eccentric thereto, with the eccentricity being on the diameter extending through the slit 20 and away from said slit. Such a disc-like socket member functions similarly to the tapered retaining ring disclosed in patent to Brozek No. 2,382,947, dated August 14, 1945, issued to the present applicant's assignee, wherein the height (radial width) of the ring sections increases from the middle section towards its free ends. However, for reasons of appearance and to insure axial alignment of stud and socket members when they are engaged, it is preferred to form the disc opening as an elongated or substantially oval opening rather than as a circular and eccentric opening, and to arrange same so that its major diameter falls on the diameter of the socket member which extends through the slit 20, and so that one curved end thereof provides the neck-receiving opening and the other end extends into the middle-line portion of the socket member, thus to diminish the radial width of said middle-line portion throughout a substantial arc thereof. Such may be simply achieved by forming the opening 19 so that its edge line is constituted by the intersecting arcs $a$ and $b$, of which the arc $a$ corresponds to a 240° (approximate) arc of a circle concentric with the outer periphery of the socket member and having radius substantially equaling that of the neck portion 12 of the stud member, and the arc $b$ is a composite of arcs of radii designed to elongate the opening at least to the diameter of the stud head 13 and extend it into the middle section $x$ of the socket member, i. e. the section opposite the slit 20, thereby to diminish the radial width of said section as compared to the radial width $y$ of the end portions of the socket member, i. e. the portions adjacent the slit 20.

By such an arrangement as illustrated and described, the advantages of a tapering section enabling the socket member to deform circularly and of an opening of generally oval or elongated contour for appearance's sake is achieved. It will also be observed that since the arc $a$ of said opening is substantially greater than 180°, the neck portion 12 of the stud member 10 is always retained in that portion of the opening 19 edged by said arc when the fastener elements are mated, and hence the fastener members are in axial alignment when engaged. A further advantage of the oval opening in the socket member is that the radial width of the middle section $x$ of the socket member can be so chosen, as by extending the arc $b$ into said section a greater or lesser amount, as to control both the pressure required to force the stud head 13 through the opening and the pressure required to separate the stud member from the socket member. In explanation, an increase in the width or radial dimension of the middle section $x$ renders the socket member relatively stiff and hence more difficult to spread both in engaging and disengaging the fastener members, whereas a decrease in said dimension of the section $x$ makes for easier spreading of the socket member, and hence for easier insertion and separation of the fastener members.

According to a further aspect of the invention, the plastic stud and socket members 10, 18 as described in the foregoing, instead of being sewn to a garment, may be attached to tapes forming therewith a so-called snap fastener tape closure, by molding them directly to said tapes during the molding of the members themselves. Such is generally illustrated in Figs. 7 and 9, of which Fig. 7 illustrates both the structure provided in the stud tape for receiving the stud members and one stud member corresponding to the aforesaid stud member 10 molded directly thereto, and Fig. 9 illustrates both the structure provided in the socket tape for receiving a socket member corresponding to the aforesaid socket member 18 and one said socket member directly molded thereto.

More particularly, the stud-member tape 25 is provided with a plurality of circular openings 26 of diameter less than that of the stud member base 11 to be formed, and which are spaced from one another a distance corresponding to the desired spacing of the plurality of socket members to be carried by said tape. Similarly, the socket-member tape 27 is provided with a plurality of spaced, generally circular openings 28 of lesser diameter than that of the disc-like socket member 18 to be formed. Preferably, the openings 28, rather than being full-circular, are provided with a short-length slot-like enlargement or recess 29 extending from the periphery thereof and which point toward one end of the tape. Said enlargements or recesses 29 are intended to register with the radial slit 20 provided in the body of the final socket members 18.

To mold the stud and socket members directly to their tapes 25, 27, it is only necessary to place said tapes in injection molding machines appropriate to the molding of said members and to position said tapes so that their openings 26, 28 are aligned with the mold cavities provided for the formation of the stud base 11 of the stud member 10 and the disc body of the socket member 18, respectively, as well as vertically intermediate the depth of said cavities whereby the fluid plastic material injected into the mold may flow over both faces of the tape material defining the openings thereof.

Figure 8:
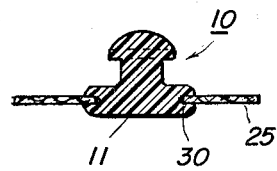
Fig. 8 is a section on line 8—8 of Fig. 7.

In this way, the plastic material making up the stud and socket members is effectively bonded to the material of the tapes throughout the edges of said openings, and hence a firm and secure attachment of stud and socket members to their tapes is simply achieved simultaneously with the molding of said members. Such attachment is illustrated in Figs. 8, 10 and 11, of which Fig. 8 illustrates how the material of the stud-member tape 25 which extends about and defines the openings 26 is firmly seated in peripheral-edge recesses 30 formed in the stud member bases 11 and is embraced by the plastic walls defining said recesses, and Figs. 10 and 11 illustrate the like seating of the material of the socket tape 27 extending about the openings 28 and their enlargements 29 in the corresponding peripheral edge recesses 32 of the socket members 18 and the embracement of said material by the walls of said recesses.

From the above, it will be seen that the invention further provides an improved snap fastener tape closure which avoids the time and labor required to attach individual snap fastener elements or members by sewing or the like to the garments for which they are intended, or to tapes in the case of the elements being attached to tapes as a closure unit. Rather, attachment is effected in the operation of molding the fastener elements themselves, and without introducing complications into the molding operation.

In its method aspects, the invention provides a simple, readily practiced and thoroughly dependable method of attaching snap fastener elements or members of plastic material according to a readily available injection molding process during and consequent to the molding of said members. Hence, not only may snap fastener closure tapes be produced at a faster rate than heretofore, but also a snap fastener tape characterized by superior holding power of snap fastener element to tape is achieved.

As many changes could be made in carrying out the above constructions without departing from the scope of the invention, it is intended that all matter contained in the above description or shown in the accompanying drawing shall be interpreted as illustrative and not in a limiting sense.

I claim:

1. A snap fastener comprising the combination of stud and socket members, each fashioned wholly of plastic material, the stud member comprising base, neck and head portions, of which the head portion has greater diameter than the neck portion and is connected to said neck portion by a chamfered shoulder, the socket member comprising solely a flat, axially rigid disc provided with a neck opening and a slit extending from said opening to the outer periphery of the disc, said opening being generally oval-shaped and arranged with its major diameter disposed on a diameter extending through the slit, one end portion of said opening extending as an arc exceeding 180° of a circle which is concentric with the outer periphery of the disc and has radius corresponding substantially to that of the neck portion of the stud member, the other end portion of said opening extending into the middle-line portion of the disc and diminishing the radial dimension of said portion throughout a substantial arc thereof, said slit and the aforesaid shaping of said opening enabling the disc to deform circularly when spread in its plane the limited amount required to permit the head portion of the stud member to pass through said opening.

2. A snap fastener as set forth in claim 1, wherein the head portion of the stud member comprises a cylindrical body terminating in a part-spherical end surface of radius imparting to said surface a slope which is less than the inclination of said chamfered shoulder whereby said stud and socket members may be engaged with lesser force than that required for their disengagement.

3. A socket member for a snap fastener of the rigid stud and resilient socket type, the socket member being made wholly of plastic material and comprising solely a flat, axially rigid disc provided with a generally central opening for receiving a stud part and a radial slit extending between said opening and the outer periphery of the disc, said opening being elongated and disposed with its major diameter on a diameter extending through the slit, one end of the opening extending along an arc exceeding 180° of a circle concentric with the outer periphery of the disc and of radius substantially equaling that of said stud part receivable in the opening, and the other end of the opening extending into the middle-line portion of the socket member opposite the slit, whereby to diminish the radial dimension of said middle-line portion throughout a substantial arc thereof, said slit and the shaping of said opening enabling the disc to deform circularly when spread in its plane by the stud member.

References Cited in the file of this patent

UNITED STATES PATENTS

| 383,702 | Carpenter | May 29, 1888 |
| 1,353,111 | Carr | Sept. 14, 1920 |
| 1,406,179 | Ford | Feb. 14, 1922 |
| 1,891,989 | Johnson | Dec. 27, 1932 |
| 2,131,255 | Naunton | Sept. 27, 1938 |
| 2,305,277 | Sloane | Dec. 15, 1942 |
| 2,397,801 | Mitchell | Apr. 2, 1946 |
| 2,439,000 | Hasenzahl | Apr. 6, 1948 |
| 2,633,618 | Moe | Apr. 17, 1953 |
| 2,724,884 | Jones | Nov. 29, 1955 |

FOREIGN PATENTS

| 24,107 | Germany | Sept. 25, 1883 |
| 168,270 | Germany | Feb. 24, 1906 |
| 692,829 | Germany | June 27, 1940 |